US012705778B1

(12) United States Patent
Chen et al.

(10) Patent No.: US 12,705,778 B1
(45) Date of Patent: Aug. 11, 2026

(54) EYE TRACKING BASED ON OPTICAL FLOW

(71) Applicant: Apple Inc., Cupertino, CA (US)

(72) Inventors: Tong Chen, Fremont, CA (US); Nicholas C. Soldner, Los Altos, CA (US); William Whitney, Capitola, CA (US)

(73) Assignee: Apple Inc., Cupertino, CA (US)

( * ) Notice: Subject to any disclaimer, the term of this patent is extended or adjusted under 35 U.S.C. 154(b) by 333 days.

(21) Appl. No.: 18/196,136

(22) Filed: May 11, 2023

Related U.S. Application Data

(60) Provisional application No. 63/342,300, filed on May 16, 2022.

(51) Int. Cl.

| | |
|---|---|
| ***G06K 9/00*** | (2022.01) |
| ***G06T 7/254*** | (2017.01) |
| ***G06T 7/292*** | (2017.01) |
| ***G06T 7/70*** | (2017.01) |
| ***G06T 7/80*** | (2017.01) |
| ***G06V 40/20*** | (2022.01) |

(52) U.S. Cl.
CPC ................ *G06T 7/70* (2017.01); *G06T 7/254* (2017.01); *G06T 7/292* (2017.01); *G06T 7/80* (2017.01); *G06V 40/20* (2022.01); *G06T 2207/10152* (2013.01)

(58) Field of Classification Search
CPC ........... G06T 7/70; G06T 7/254; G06T 7/292; G06T 7/80; G06T 2207/10152; G06T 2207/30041; G06T 7/74; G06V 40/20; G06F 3/012; G06F 3/011; G06F 3/013; G06F 3/0304; G06F 3/048; H04N 13/366; H04N 13/30
See application file for complete search history.

(56) References Cited

U.S. PATENT DOCUMENTS 10,846,515 B2 * 11/2020 Dehghan .............. G06V 40/167
2003/0169907 A1 * 9/2003 Edwards ................ G06V 40/18 382/118
2017/0131765 A1 5/2017 Perek et al.

* cited by examiner

*Primary Examiner* — Duy M Dang
(74) *Attorney, Agent, or Firm* — Thompson Hine LLP

(57) ABSTRACT

Eye motion is determined based on optical flow in images of an eye where the images are of reflections of light (coherent or incoherent) off of an eye. The reflections may be produced by selectively using one or more light sources and/or the images may be captured by selectively using one or more image sensors. For example, a subset of less than all of multiple available light sources and/or a subset of less than all of multiple available image sensors may be selected and used at a time based on the pose of the eye. One of the light sources and/or image sensors may be best suited for capturing images for eye tracking purposes when the user is looking left and while another light source and/or image sensor may be best suited when the user is looking right. The light sources and/or image sensors may be positioned to enable capturing images across the full range of eye poses.

26 Claims, 6 Drawing Sheets

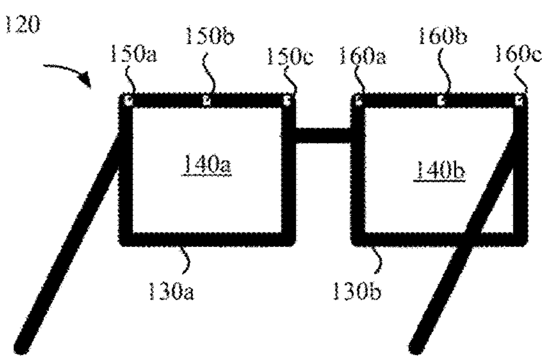
FIG. 1
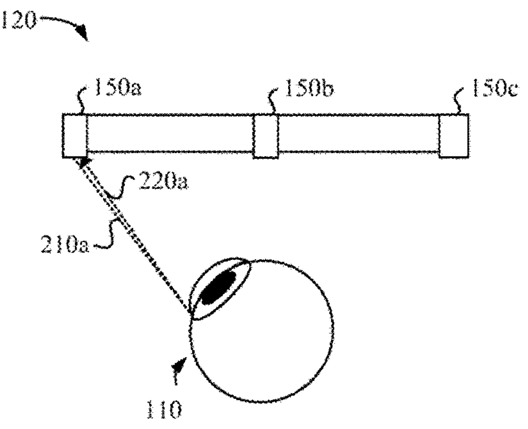
FIG. 2A
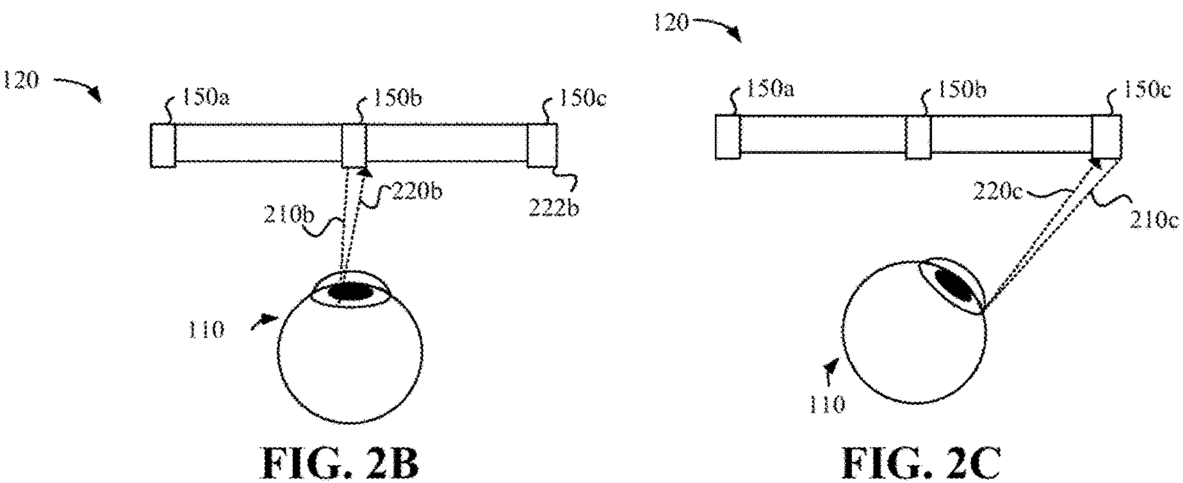
FIG. 2B
FIG. 2C

EYE TRACKING BASED ON OPTICAL FLOW

CROSS-REFERENCE TO RELATED APPLICATIONS

This application claims the benefit of U.S. Provisional Application Ser. No. 63/342,300 filed May 16, 2022, which is incorporated herein in its entirety.

TECHNICAL FIELD

The present disclosure generally relates to electronic devices, and in particular, to systems, methods, and devices for tracking eye characteristics of users of electronic devices.

BACKGROUND

Some existing eye-tracking techniques produce light that is reflected off of a user's eye as one or more glints that are captured in images via an image sensor. The patterns of the glints in the images may be analyzed to determine positions or orientations of user eyes. Existing tracking systems may lack efficiency, accuracy, or other characteristics that are desirable for various eye tracking applications.

SUMMARY

Eye motion is determined based on optical flow in images of an eye where the images are of reflections of light (coherent or incoherent) off of an eye. The reflections may be produced by selectively using one or more light sources and/or the images may be captured by selectively using one or more image sensors. For example, a subset of less than all of multiple available light sources and/or a subset of less than all of multiple available image sensors may be selected and used at a given time based on the pose of the eye. One of the light sources and/or one of the image sensors may be best suited for capturing images for eye tracking purposes when the user is looking left and while another light source and/or another image sensor may be best suited when the user is looking right. The light sources and/or image sensors may be positioned to enable capturing images across the full range of possible eye poses. Tracking may involve tracking imaged features in light reflected from the cornea, iris, sclera, or other diffuse or specularly-reflecting eye surface, interface, or volume portions. A process such as a signal processing algorithm or machine learning model may be used to translate frame-to-frame changes in the observed optical features into a target velocity or displacement from which eye motion may be determined.

In some implementations, a method is performed to track a pose of an eye over time. The method may use an optical sensor that includes one or more processors (e.g., ASICs, microprocessors, etc.) that execute(s) stored instructions, one or more light emitters, and one or more light receivers. The method selects a light source of a plurality of light sources and/or an image sensor of a plurality of image sensors based on a pose of an eye. The pose of the eye may be known or predicted from a prior determination of the same or different eye tracking components. The method produces light from the selected light source towards a portion of a surface, interface, or volume of the eye, the light reflecting from the portion of the surface, interface, or volume of the eye as reflected light. The method captures a sequence of images of the reflected light using one or more image sensors. The method assesses image-to-image changes in the sequence of images, the image-to-image changes comprising an amount and a direction of positional change in at least one feature depicted in the images. For example, the method may assess such changes to determine a target velocity based on an amount of change of a feature over time. The method determines a movement of the eye based on the image-to-image changes in the sequence of images. For example, this may involve determining an amount and direction of eye movement based on the amount and direction of image-to-image changes (e.g., optical flow) and the relative positioning between the one or more image sensors and the eye. The eye's movement may be used to determine the eye's pose at a given time and/or to identify gaze direction, fixations, saccades, and other eye movement and fixation events.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 1 illustrates an exemplary device in accordance with some implementations.

FIGS. 2A-2C illustrate the exemplary device of FIG. 1 performing eye tracking in accordance with some implementations.

Figure 3A:
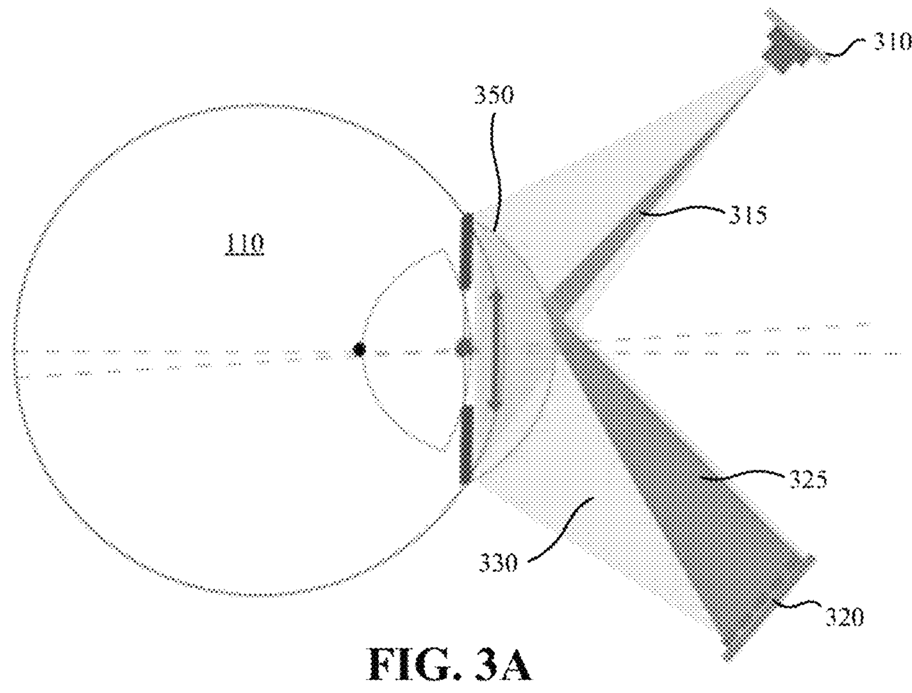
FIGS. 3A-3B illustrate device component illuminating and capturing images of an illuminated portion of an eye in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Eye monitoring technology is important in various contexts. For example, eye monitoring may be used with near-eye display and extended reality (XR) systems. Gaze position tracking may provide the input for display foveated rendering, human-computer interaction, etc. Traditional camera video-based gaze trackers rely on active illumination and simultaneous feature extraction of pupil center and cornea glints from high resolution and high SNR image captures. The power consumption, form factor, computational cost and latency of such trackers may be significant burdens in various contexts, for example, with respect to resource constrained XR devices. Fast, accurate, and efficient detection and classification of subtle eye movements, such as smooth pursuit, saccade, fixation, and nystagmus can be very important in these and other contexts. However, such processes may be challenging for video-based or photodetector-based tracking systems with stringent power budgets. For example, fixation can be as short as a few tens of microseconds and as subtle as <0.25 deg motion or <0.5 deg/s speed, illustrating the requirement for high-resolution and high frame-rate imaging and processing systems.

Some implementations provide a methodology and system to track user eye movement using optical flow. In a first form, coherent light source-based (e.g., laser-based) tracking of feature patterns (e.g., speckles) in light reflected from an eye portion (e.g., the cornea) is used to determine eye motion. In this scheme, the eye portion (e.g., cornea) is illuminated by a fixed or scanning beam of one or multiple semiconductor lasers. Such one or more lasers are configured to have power limited for safe and suitable use in eye tracking applications. Part or all of the specularly-reflected optical beam is captured by one or more image sensors, e.g., one or more high frame-rate, low resolution image sensors. Signal processing algorithms are used to translate frame-to-frame changes in the images (e.g., in observed speckle patterns) to target velocity, from which eye motion is extracted.

In a second form, LED-based tracking of imaged features in light reflected from an eye portion (e.g., cornea, iris, sclera, or other diffuse or specularly-reflecting eye component) is used to determine eye motion. In this scheme, the eye is illuminated by a fixed or scanning beam of one or multiple light sources (e.g., LEDs). Such one or more light sources are configured to have power limited for safe and suitable use in eye tracking applications. One or more lenses may be used to image the reflected or scattered optical signal onto one or more image sensors, e.g., one or more high frame-rate, low resolution image sensors. Signal processing algorithms are used to translate frame-to-frame changes in the images (e.g., the observed scene features) to target velocity, from which eye motion is extracted.

Classification and quantification of user gazing behavior, such as blinking, smooth pursuit, saccade, fixation, nystagmus may be identified at high sampling rate to facilitate high efficiency, high fidelity digital content rendering of near eye display system.

In some implementations, an optical flow-based eye tracking modality is fused with another eye tracking modality. For example, an absolute gaze direction sensing modality using a lower sampling rate gaze imaging system may be used to synergistically enhance speed and accuracy of optical-flow based tracking. Such fusion may enable absolute gaze tracking at higher speed and with better accuracy than may be possible with a single sensing modality.

FIG. 1 illustrates an example device 120. The device 120 includes a frame portion 130*a* supporting a left eye viewing portion 140*a* and a frame portion 130*b* supporting a right eye viewing portion 140*b*. The device 120 also includes one or more eye-tracking modules 150*a-c* for tracking a left eye and one or more eye tracking modules 160*a-c* for tracking a left eye. The eye-tracking modules 150*a-c*, 160*a-c* may each include one or more processors, one or more light sources, and one or more image sensors. The one or more image sensors may include any type of sensor capable of capturing images based on receiving light, e.g., a CMOS sensor configured to convert the charge from photosensitive pixels to voltages at individual pixel sites that are recorded as images of pixel values in rows and columns. The one or more image sensors may be configured to capture the same type of light (e.g., IR light, light within a particular wavelength range, etc.) as is the light that is emitted by the one or more light sources. The eye tracking modules 150*a-c*, 160*a-c* may include one or more lenses to focus light on the one or more image sensors.

These eye tracking modules 150*a-c*, 160*a-c* may be configured to use optical flow to determine eye movements. Such optical flow tracking may involve tracking spatio-temporal image brightness variation (e.g., frame to frame) to estimate motion. It may involve speckle flow tracking that analogously tracks speckle patterns resulting from coherent illumination to estimate motion, without necessarily using a lens. The device 120 may utilize optical flow to track target velocity or displacement of eye features in images of illuminated eye portions. Such velocity may be used directly, e.g., by an XR system, or integrated to obtain eye pose information.

The viewing portions 140*a-b* of device 120 may be transparent (e.g., lenses) portions through which a user can directly see their surrounding physical environment. In some implementations, the device 120 displays content to a user 110. The viewing portions 140*a-b* may be transparent (e.g., lenses) upon which content may be displayed, e.g., via optical wave guides within transparent lenses. In other implementations, the viewing portions 140*a*, 140*b* are electronic displays upon which images may be displayed to the user. In some implementations, the content can occupy the entirety of viewing portions 140*a-b*. In some implementations, the content occupies only some (but not all) of the viewing portions 140*a-b*.

In some implementations, the device 120 comprises one or more processors, memory, and one or more modules, programs or sets of instructions stored in the memory for performing multiple functions. The device 120 may provide a graphical user interface (GUI). For example, content that is displayed to a user of device 120 at viewing portions 140*a-b* may include a user interface or portions thereof, e.g., a button, a user interface icon, a text box, a graphic, etc. In some implementations, a user interacts with the GUI by providing input, e.g., via gestures and/or eye-based input such as gaze-based input. In some implementations, the functions include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In some implementations, the device 120 is a wearable device such as a head-mounted device (e.g., HMD) as illustrated in FIG. 1. In some implementations the device 120 is a hand-held device, a laptop computer, or a desktop computer. In some implementations, the device 120 has a touchpad and, in some implementations, the device 120 has a touch-sensitive display (also known as a "touch screen" or "touch screen display").

FIGS. 2A-2C illustrate the exemplary device 120 performing eye tracking. In this example, as shown in FIG. 2A, based on the current/expected pose of the eye 110 having a first orientation, eye tracking module 150*a* (e.g., a first particular light source and image sensor pair) is selected and used to track the eye 110. In this example, a light source in eye tracking module 150*a* produces light 210*a* that produces reflections 220*a* off of the eye 110, and these reflections 220*a* are captured in images by an image sensor of the eye tracking module 150*a*. These images may have pixels with light intensity values that correspond to patterns on the surface, interface, or volume of a local region of the eye 110 as illuminated by the light 210*a*.

As the eye pose changes or is predicted to change, the eye tracking system adapts and selects a new eye tracking module. For example, as shown in FIG. 2B, based on the current/expected pose of the eye 110 having a second orientation, eye tracking module 150*b* (e.g., a second particular light source and image sensor pair) is selected and used to track the eye 110. In this example, a light source in eye tracking module 150*b* produces light 210*b* that produces reflections 220*b* off of the eye 110, and these reflections 220*b* are captured in images by an image sensor of the eye tracking module 150*b*. These images may have pixels with light intensity values that correspond to patterns on the surface, interface, or volume of the eye 110 as illuminated by the light 210*b*.

As the eye pose continues to change or is predicted to continue changing, the eye tracking system adapts and selects a new eye tracking module. For example, as shown in FIG. 2C, based on the current/expected pose of the eye 110 having a third orientation, eye tracking module 150*c* (e.g., a third particular light source and image sensor pair) is selected and used to track the eye 110. In this example, a light source in eye tracking module 150*c* produces light 210*c* that produces reflections 220*c* off of the eye 110, and these reflections 220*c* are captured in images by an image sensor of the eye tracking module 150*c*. These images may have pixels with light intensity values that correspond to patterns on the surface, interface, or volume of the eye 110 as illuminated by the light 210*c*.

Figure 3B:
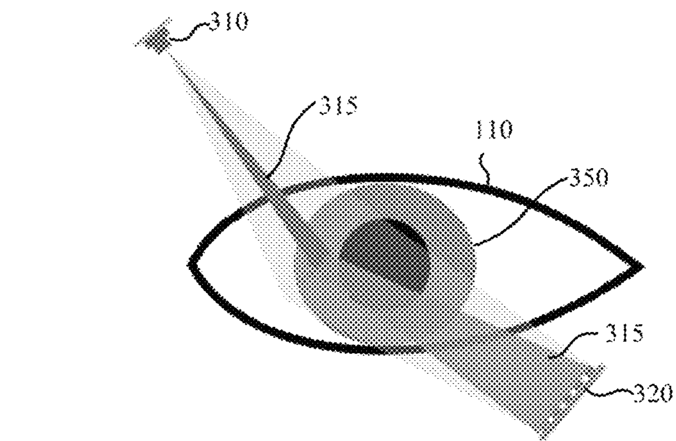

FIGS. 3A-3B illustrate device components illuminating and capturing images of an illuminated portion of an eye 110. This is an example of a coherent light-based eye tracking module. In this example, an eye tracking module includes a light source 310 and an image sensor 320. The light source 310 is a laser illuminator that produces light 315 towards the eye 110, illuminating a portion of the eye (e.g., a portion of the cornea 350). Reflections 325 (e.g., cornea specular light) of light 315 off of the cornea 350 are produced and captured by image sensor 320 to form one or more images/frames. In some implementations, the image sensor 320 is relatively low resolution (e.g., 50×50 pixels, 40×40 pixels, 30×30 pixels, 25×25 pixels, 20×20 pixels, etc.) and has a relatively high frame rate (e.g., greater than 30 Hz, 40 Hz, 50 Hz, 60 Hz, 90 Hz, 120 Hz). Light 330 is reflected from the eye diffusively and represents an offset illumination source from the eye which would be reflected onto sensor 320 and would be differentiated from reflections 325.

Figure 4:
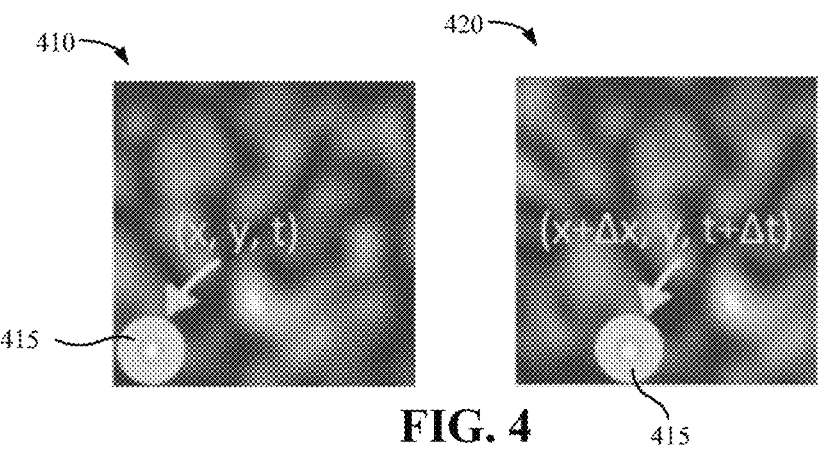
FIG. 4 illustrates example images captured during eye tracking in accordance with some implementations.

FIG. 4 illustrates example images 410, 420 captured during eye tracking. As is illustrated, a feature pattern/speckle 415 is detected in each of the images 410, 420 and the change in the position of the feature pattern/speckle 415 over the time period between images can be used to determine a target velocity. The amount of change of position in the x direction and the amount of change in the y direction can be used to determine a rate of change of the pattern/speckle 415, which may be used as an approximation of the rate of change of the eye 110. Given the relative positioning between the image sensor and the eye and the rate of change of the eye, movements of the eye and its 3D pose can be tracked. For example, the gaze direction relative to a display or HMD lens may be tracked over time to estimate in what direction and at what a user is gazing.

Figure 5:
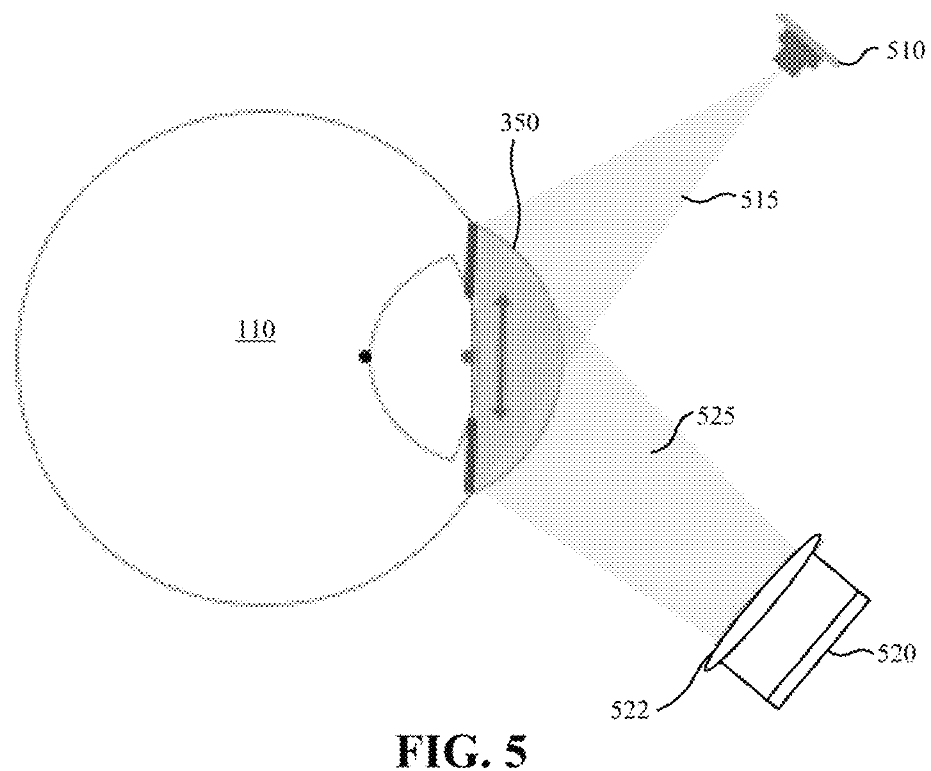
FIG. 5 illustrates device component illuminating and capturing images of an illuminated portion of an eye in accordance with some implementations.

FIG. 5 illustrates device components illuminating and capturing images of an illuminated portion of an eye 110. This is an example of an incoherent light-based optical flow-based eye tracking module. In this example, the eye tracking module includes a light source 510 and an image sensor 520. The light source 510 is a light emitting diode (LED) illuminator that produces light 515 towards the eye 110, illuminating a portion of the eye (e.g., a portion of the cornea 350 and/or other eye components). Reflections 525 of light 515 off of the eye 110 are produced, directed by the lens 522, and captured by image sensor 520 to form one or more images/frames. The image sensor 520 may or may not be in the specular path. In some implementations, the image sensor 520 is relatively low resolution (e.g., 50×50 pixels, 40×40 pixels, 30×30 pixels, 25×25 pixels, 20×20 pixels, etc.) and has a relatively high frame rate (e.g., greater than 30 Hz, 40 Hz, 50 Hz, 60 Hz, 90 Hz, 120 Hz).

Implementations Utilizing Multiple Emitters and/or Receivers

For some devices and use cases, e.g., such as laser/speckle flow tracking as illustrated in FIG. 3), it may be difficult to guarantee specular geometry between a single pair of emitter/receiver across eyeball/cornea motion, user head motion, user wearing working distance, etc. To address this and to provide other advantages, some implementations configure a device with multiple light sources and/or multiple image sensors positioned at different orientations and positions relative to each of the user's eyes, and adaptively enable a light source and/or image sensor for a desirable level of specular coverage. In one example, desirable/best specular coverage is defined as the first glint (specular reflections from outer cornea surface) from the specific emitter are captured in good SNR by the specific receiver. When it goes out-of-range for the currently utilized pair, a scan through different pairs (and/or a prediction via previous measured eye motion using speckle flow tracking or other eye tracking hardware) are used to determine the next best pair to be used.

Two example schemes by which emitter/receiver combinations may be selected are described here. In the first scheme, abbreviated scans of various combinations of emitters and receivers are fired serially or in parallel, and a combination that maximizes signal to noise ratio is selected by brute force or other standard optimization techniques. No knowledge of past behavior is required. In the second scheme, knowledge of eye motion and/or signal to noise ratio across emitter/receiver combinations is used to predict the emitter/receiver combination that will maximize signal to noise ratio during the subsequent measurement frame. Predictive techniques for this latter scheme may include tracking of image signal centroid(s), as in standard touch gesture processing algorithms; machine learning classification of eye gestures and prediction of future trajectories; and incorporation of information from other sensors, such as lower frame rate camera modules. These techniques may utilize one or more frames of historical data to select an optimal measurement configuration for the subsequent frame. The two schemes described above, as well as other algorithms, may be used together or selected between based on metrics quantifying real-time confidence in predictions made.

Figure 6A:
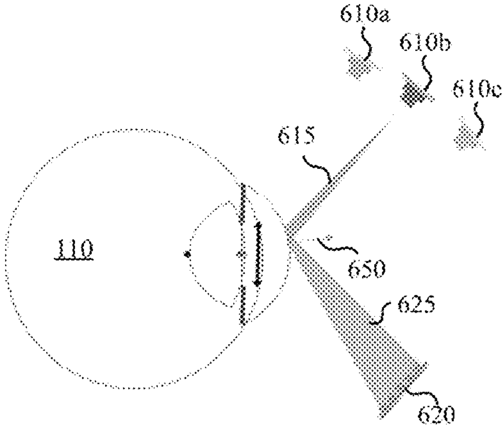
FIGS. 6A-6B illustrate illumination of an eye via a selected light source of multiple light sources during eye tracking in accordance with some implementations.
Figure 6B:
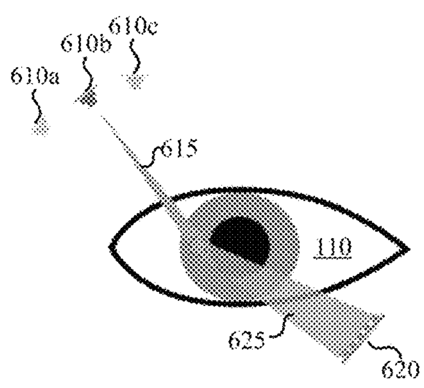

FIGS. 6A and 6B illustrate illumination of an eye 110 via a selected light source 610*b* of multiple light sources 610*a-c* during eye tracking. In this example, there are three light sources 610*a-c* positioned at different positions and orientations relative to eye 110. These light sources 610*a-c* may be selectively activated, e.g., based on the eye's 110 current or predicted pose, to illuminate the eye with the most appropriate light source given its current or expected pose. In this example, given the eye's 110 current pose, light source 610*b* is activated. Light source 610*b* produces light 615 illuminating a portion of the eye 110 and causing reflections 625 that are captured by image sensor 620. Note that given the normal direction 650 of the captured portion of the eye 110, the reflections 625 are specular reflections, in this example.

Figure 7A:
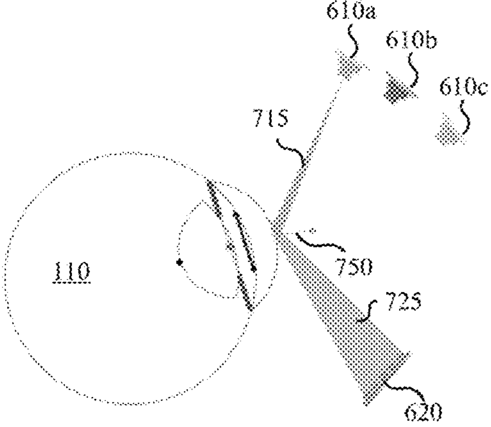
FIGS. 7A-7B illustrate illumination of an eye via another selected light source of the multiple light sources during eye tracking in accordance with some implementations.
Figure 7B:
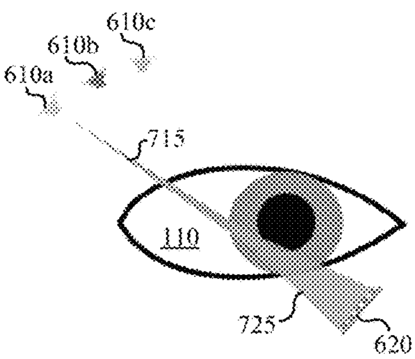

FIGS. 7A and 7B illustrate illumination of an eye 110 via another selected light source 610*a* of the multiple light sources 610*a-c* during eye tracking. In this example, given the eye's 110 current pose, light source 610*ba* is activated. Light source 610*a* produces light 715 illuminating a portion of the eye 110 and causing reflections 725 that are captured by image sensor 620. Note that given the normal direction 750 of the captured portion of the eye 110, the reflections 725 are specular reflections, in this example.

Figure 8A:
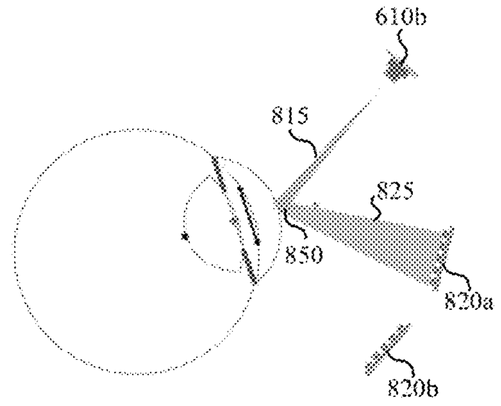
FIGS. 8A-8B illustrate capturing images of an illuminated eye portion via a selected image sensor of multiple image sensors during eye tracking in accordance with some implementations.
Figure 8B:
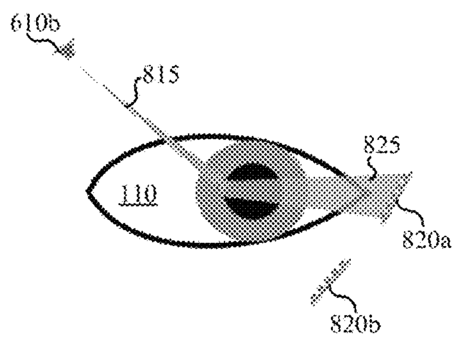

FIGS. 8A and 8B illustrate capturing images of an illuminated eye portion via a selected image sensor 820*a* of multiple image sensors 820*a-b* during eye tracking. Light source 610*b* produces light 815 illuminating a portion of the eye 110 and causing reflections 825 that are captured by image sensor 820*a*, which is activated based on the eye's 110 current pose. Note that given the normal direction 850 of the captured portion of the eye 110, the reflections 825 are specular reflections, in this example.

Sensor Fusion

In some implementations, optical flow-based eye tracking according to the techniques disclosed herein is combined with another source of eye tracking utilizing additional sensors. Such sensor fusion-based eye tracking may be implemented in various ways and provide various advantages. For example, the non-optical flow-based eye tracking may be used to select the light sources and/or image sensors that are used in the optical flow-based eye tracking. In one example implementation, a relatively higher rate (e.g., 120 Hz/240 Hz) optical flow eye tracking system is combined with a relatively lower rate (e.g., 15 Hz/30 Hz/60 Hz) sparse visual eye tracking system. In some implementations, optical flow eye tracking data is fused with other eye tracking data regarding the absolute gaze direction obtained via direction sensing from a lower sampling rate gaze system. Such fusing may enhance speed and accuracy of the overall system (e.g., achieve absolute gaze tracking at higher speed and better accuracy than is possible with a single sensing modality).

Figure 9:
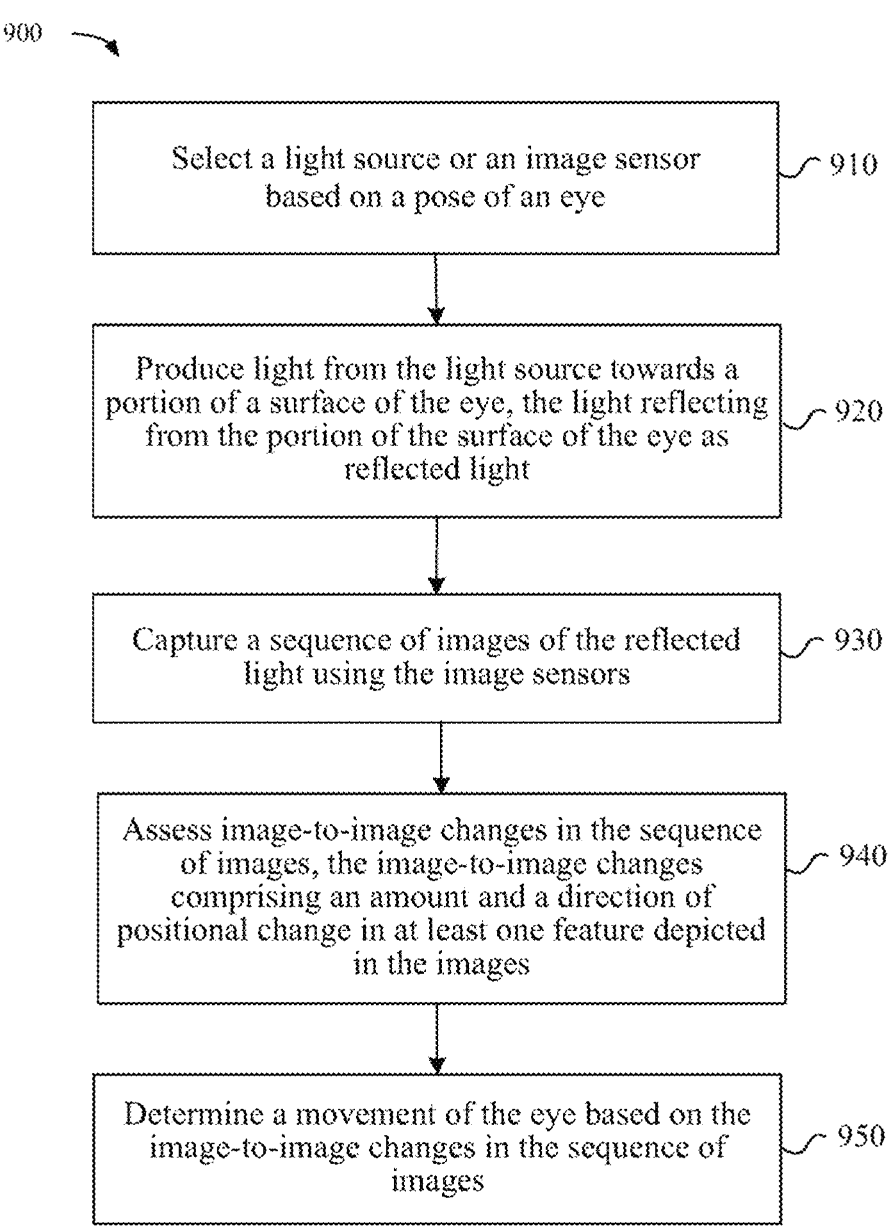
FIG. 9 is a flowchart representation of a method for tracking an eye in accordance with some implementations.

FIG. 9 is a flowchart illustrating an exemplary method 900 for tracking an eye characteristic. In some implementations, a device (e.g., device 120 of FIG. 1) performs the techniques of method 900. In some implementations, the techniques of method 900 are performed on a wearable device, HMD, mobile device, desktop, laptop, or server device. In some implementations, the method 900 is performed by processing logic, including hardware, firmware, software, or a combination thereof. In some implementations, the method 900 may be performed on a processor executing code stored in a non-transitory computer-readable medium (e.g., a memory).

At block 910, the method 900 selects and activates a light source of a plurality of light sources or an image sensor of a plurality of image sensors based on a pose of an eye. The plurality of light source may include coherent light sources, e.g., one or more lasers. The light source may include one or more fixed position incoherent light sources, e.g., one or more light emitting diodes (LEDs), superluminescent diodes, etc. The light sources may include one or more scanning beam incoherent lights sources. In some implementations, the plurality of image sensors include standard CMOS image sensor receiver(s). In other implementations, the image sensors comprise higher sensitivity receiver(s) such as single photon avalanche detector arrays for improved SNR, including region-of-interest scan plans to improve SNR and reduce readout time by measuring only critical pixels.

In some implementations, the light source is selected based on identifying which of the light source provides desirable or best specular coverage. In some implementations, the image sensor is selected based on identifying which of the image sensors provides desirable or best specular coverage or other characteristic assessed based on relative positioning between the respective light source, image sensor, and/or a portion of the eye. In some implementations, an image sensor of the plurality of image sensors corresponds to each of the plurality of light sources forming light source-to-image sensor pairs. In some implementations, a pair (i.e., light source and corresponding image sensor) is selected based on the pose of the eye. A particular light source, a particular image sensor, and/or a particular light source to image sensor pair may be selected to track the eye movement.

Desirable or best specular coverage may be defined as occurring when a specular reflection from a particular eye portion (e.g., an outer cornea surface) from the specific emitter is captured with good signal to noise (SNR) by the image sensor.

In some implementations, multiple light source-to-image sensor pairs are included within a device and a respective pair of the pairs is selected based on the pose of the device. The device may be configured to provide multiple optical paths from the plurality of light sources to the plurality of image sensors, where the multiple optical paths are configured to capture images of the portion of the eye while the eye is positioned in any position within an entire range of eye motion of the eye, i.e., all possible eye orientations within physiological limits. The method 900 may make light source and/or image sensor selections to toggle between the multiple optical paths based on tracking movement of the eye.

At block 920, the method 900 produces light from the light source towards a portion of the eye, the light reflecting from the portion of the eye as reflected light. In some implementations, the light is IR light.

At block 930, the method 900 captures a sequence of images of the reflected light using the image sensor and, at block 940, the method 900 assesses image-to-image changes in the sequence of images. The image-to-image changes may comprise and thus be evaluated to determine an amount and a direction of positional change in at least one feature depicted in the images. This may involve determining a target velocity of speckles or other features on the eye images based on an amount of change over time.

At block 950, the method 900 determines a movement of the eye based on the image-to-image changes in the sequence of images. Determining the movement of the eye may be based on tracking an eye portion (e.g., cornea) for speckle flow or scattering structures such as the iris, sclera, or other targets for incoherent optical flow. Determining the movement of the eye may involve determining an amount and direction of eye movement based on the amount and direction of image-to-image changes (optical flow) and the relative positioning between the one or more image sensors and the eye. Determining optical flow may be based on determining a velocity based on the image-to-image changes in the sequence of images. Determining the movement of the eye may involve determining an angular velocity of the eye and/or determining an angular position of the eye.

In some implementations, tracked movement of the eye is used to identify a particular eye behavior, e.g., classifying and/or quantifying a user gaze behavior. Determining the movement of the eye may involve identifying a blink, smooth pursuit, saccade, fixation, or nystagmus of the eye.

In some implementations, determining the movement of the eye involves determining an eye characteristic based on the determining of the movement of the eye and a gaze direction determined from a second tracking system, e.g., a second tracking system having a sampling rate that is less than a frame rate of the one or more image sensors.

In some implementations, the method 900 calibrates motion tracking output to compensate for geometrical factors. This may involve calibration of motion tracking output to compensate for target tilt or other geometrical factors, including in-field calibration based on data from other sensors. Relative orientation changes between the left and right optical subsystem can be detected through comparison of gaze vectors comprised from the left and right eye when the user fuses on distant virtual objects.

In some implementations, the method 900 uses a fusion eye tracking technique. For example, the method 900 may determine the eye movement based both coherent and incoherent light sources illuminating the eye or based on an optical flow-based tracking technique and a non-optical flow-based tracking technique.

In some implementations, the determined eye movement is used as input to the electronic device. For example, a determined gaze direction may be used to determine an object that the user is interested in, gazing at, fixated on, etc, or a set of content within a foveal zone of the user. A determined user fixation may be used to identify one or more user interface elements that the user intends to interact with. A determined speed of eye movement may be used to identify a user intention or activity, e.g., reading. In some implementations, a functionality on the electronic device is initiated based on assessing the image-to-image changes in the sequence of images. For example, eye movement data may be used to wake up an XR system, drive foveated rendering, or serve as a general input to UI functionality.

In some implementations, the method 900 is performed by a head mounted device (HMD). The image sensor and light source components of the eye tracking system on such an HMD may be located at one or more fixed position on the HMD (e.g., at fixed positions around a frame portion of viewing portions as illustrated in FIG. 1) and thus be used to track the eye's position and/or orientation relative to the HMD over time. In some cases, the eye tracking system provides real-time, live eye tracking as the user uses the HMD to view the surrounding physical environment and/or content displayed on the HMD, e.g., as an extended reality (XR) environment.

The use of multiple light sources and/or image sensor sub-systems may expand trackable range of motion beyond that which would be possible using single image sensors and/or single light sources. Moreover, the selections of which components to use may be based on the locations of a selected light source and/or a selected image sensor to provide a desirable optical path given the current eye pose. Such locations may provide a variety of optical paths for specular reflections from one or more components of the eye (i.e., the cornea) in a broad or complete range of eye poses. The device may be configured to provide multiple optical paths (light source to image sensor), each intended to cover a certain region of eye motion. Some implementations utilize an adaptive scan and relay among "neighboring" optical paths to intelligently toggle between paths when the eye exits the coverage of one and enters another, based on tracking of path SNR and/or fusion w/other available sensors.

In some implementations, the method 900 utilized an adaptive laser/LED emission and beam shaping system that may comprise of an addressable laser/LED emitter array (for example, a near-infrared, 2D VCSEL array) with near-field and/or far-field laser optics to expand trackable range of motion.

Figure 10:
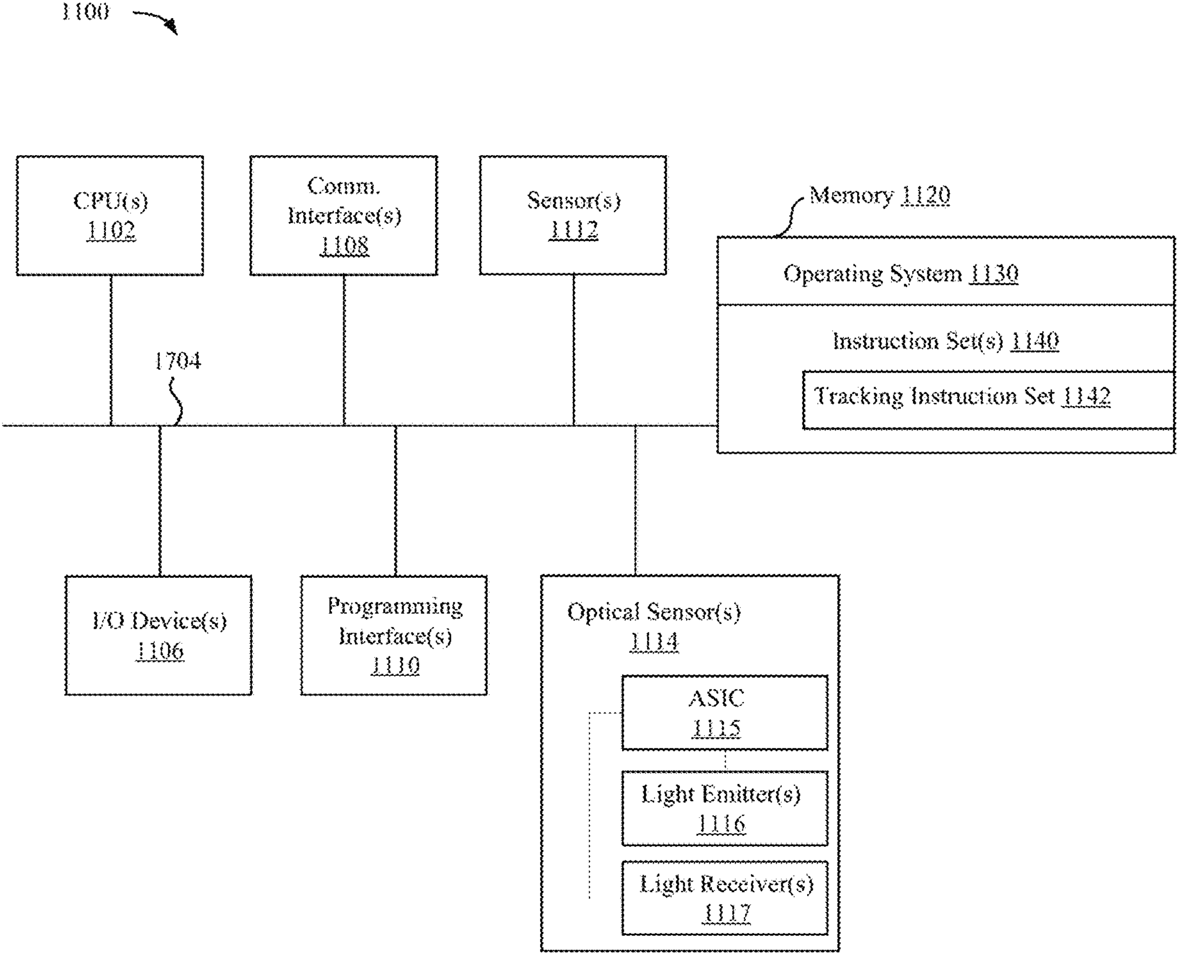
FIG. 10 is a block diagram of an example electronic device in accordance with some implementations.

FIG. 10 is a block diagram of an example device 1100. Device 1100 illustrates an exemplary device configuration for device 120. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 10 includes one or more processing units 1102 (e.g., microprocessors, ASICs, FPGAs, GPUs, CPUs, processing cores, and/or the like), one or more input/output (I/O) devices and sensors 1106, one or more communication interfaces 1108 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 1110, one or more displays, one or more sensors 1112 including one or more optical sensors 1114, a memory 1120, and one or more communication buses 1104 for interconnecting these and various other components.

In some implementations, the one or more communication buses 1104 include circuitry that interconnects and controls communications between system components. In some implementations, the one or more I/O devices and sensors 1106 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 1112 are configured to present a view of a physical environment or a graphical environment to the user. In some implementations, the one or more displays 1112 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 1112 correspond to diffractive, reflective, polarized, holographic, etc. waveguide displays. In one example, the device 1100 includes a single display. In another example, the device 1100 includes a display for each eye of the user.

In some implementations, the one or more optical sensors 1114 are configured to track eye movement. For example, the one or more image sensor systems 1114 include one or more ASIC 1115, one or more light emitters 1116 (e.g., coherent and/or incoherent light sources), one or more light receivers (e.g., with a complimentary metal-oxide-semiconductor (CMOS) image sensors or a charge-coupled device (CCD) image sensors). In various implementations, the optical sensors 1114 include or interact with an on-camera image signal processor (ISP) configured to execute a plurality of processing operations on the image data.

The memory 1120 includes high-speed random-access memory, such as DRAM, SRAM, DDR RAM, or other random-access solid-state memory devices. In some implementations, the memory 1120 includes non-volatile memory, such as one or more magnetic disk storage devices, optical disk storage devices, flash memory devices, or other non-volatile solid-state storage devices. The memory 1120 optionally includes one or more storage devices remotely located from the one or more processing units 1102. The memory 1120 includes a non-transitory computer readable storage medium.

In some implementations, the memory 1120 or the non-transitory computer readable storage medium of the memory 1120 stores an optional operating system 1130 and one or more instruction set(s) 1140. The operating system 1130 includes procedures for handling various basic system services and for performing hardware dependent tasks. In some implementations, the instruction set(s) 1140 include executable software defined by binary information stored in the form of electrical charge. In some implementations, the instruction set(s) 1140 are software that is executable by the one or more processing units 1102 to carry out one or more of the techniques described herein.

The instruction set(s) 1140 include tracking instruction set 1142, which may be embodied a single software executable or multiple software executables. In some implementations, the tracking instruction set 1142 is executable by the processing unit(s) 1102 to track an eye characteristic as described herein. It may determine eye position, orientation, accommodation, etc. based on a comparison of one or more captured images or other sensor data of the eye using one or more of the techniques discussed herein or as otherwise may be appropriate. To these ends, in various implementations, the instruction includes instructions and/or logic therefor, and heuristics and metadata therefor.

Although the instruction set(s) 1140 are shown as residing on a single device, it should be understood that in other implementations, any combination of the elements may be located in separate computing devices. Moreover, FIG. 11 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of physiological data to improve a user's experience of an electronic device with respect to interacting with electronic content. The present disclosure contemplates that in some instances, this gathered data may include personal information data that uniquely identifies a specific person or can be used to identify interests, traits, or tendencies of a specific person. Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve interaction and control capabilities of an electronic device. Accordingly, use of such personal information data enables calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to “opt in” or “opt out” of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access his or her stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as “processing,” “computing,” “calculating,” “determining,” and “identifying” or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of “adapted to” or “configured to” herein is meant as open and inclusive language that does not foreclose devices adapted to or configured to perform additional tasks or steps. Additionally, the use of “based on” is meant to be open and inclusive, in that a process, step, calculation, or other action “based on” one or more recited conditions or values may, in practice, be based on additional conditions or value beyond those recited. Headings, lists, and numbering included herein are for ease of explanation only and are not meant to be limiting.

It will also be understood that, although the terms “first,” “second,” etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the “first node” are renamed consistently and all occurrences of the “second node” are renamed consistently. The first node and the second node are both nodes, but they are not the same node.

The terminology used herein is for the purpose of describing particular implementations only and is not intended to be limiting of the claims. As used in the description of the implementations and the appended claims, the singular forms “a,” “an,” and “the” are intended to include the plural forms as well, unless the context clearly indicates otherwise. It will also be understood that the term “or” as used herein refers to and encompasses any and all possible combinations of one or more of the associated listed items. It will be further understood that the terms “comprises” or “comprising,” when used in this specification, specify the presence of stated features, integers, steps, operations, objects, or components, but do not preclude the presence or addition of one or more other features, integers, steps, operations, objects, components, or groups thereof.

As used herein, the term “if” may be construed to mean “when” or “upon” or “in response to determining” or “in accordance with a determination” or “in response to detecting,” that a stated condition precedent is true, depending on the context. Similarly, the phrase “if it is determined [that a stated condition precedent is true]” or “if [a stated condition precedent is true]” or “when [a stated condition precedent is true]” may be construed to mean “upon determining” or “in response to determining” or “in accordance with a determination” or “upon detecting” or “in response to detecting” that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:

selecting, at an electronic device having a processor, a light source from a plurality of light sources or an image sensor from a plurality of image sensors for optical-flow-based eye tracking, wherein the light source or image sensor is selected based on a pose of an eye;

producing, at the electronic device, light from the light source towards a portion of the eye, the light reflecting from the portion of the eye as reflected light;

capturing, at the electronic device, a sequence of images of the reflected light using the image sensor;

assessing, at the electronic device, image-to-image changes in the sequence of images, the image-to-image changes comprising an amount and a direction of positional change in at least one feature depicted in the images; and determining, at the electronic device, a movement of the eye based on the image-to-image changes in the sequence of images.

2. The method of claim 1, wherein the method selects the light source from the plurality of light sources based on the pose of the eye.

3. The method of claim 1, wherein the method selects the image sensor from the plurality of image sensors based on the pose of the eye.

4. The method of claim 1, wherein the electronic device comprises a plurality of light source-to-image sensor pairs, wherein a respective pair of the pairs is selected to track the eye movement based on the pose of the eye.

5. The method of claim 1, wherein selecting the light source or the image sensor is based on specular coverage.

6. The method of claim 1, wherein the electronic device is configured to provide multiple optical paths from a plurality of light sources to a plurality of image sensors, wherein the multiple optical paths are configured to capture images of the portion of the eye while the eye is positioned in any position within an entire range of eye motion of the eye.

7. The method of claim 6 further comprising toggling between the multiple optical paths based on tracking movement of the eye.

8. The method of claim 1, wherein the plurality of light sources comprises one or more lasers.

9. The method of claim 1, wherein the light source comprises one or more fixed position light emitting diodes (LEDs).

10. The method of claim 1, wherein the light source comprises one or more scanning beam light emitting diodes (LEDs).

11. The method of claim 1, wherein determining the movement of the eye comprises:

determining an optical flow; and determining an amount and direction of eye movement based on the optical flow and the relative positioning between the one more image sensors and the eye.

12. The method of claim 11, wherein determining the optical flow is based on determining a velocity based on the image-to-image changes in the sequence of images.

13. The method of claim 1, wherein the portion of the eye is a cornea, iris, or sclera of the eye.

14. The method of claim 1, wherein a resolution of each of the one or more image sensors is less than 50 by 50 pixels.

15. The method of claim 1, wherein a frame rate of the one or more image sensors is greater than 30 frames per second.

16. The method of claim 1, wherein determining the movement of the eye comprises determining an angular velocity of the eye.

17. The method of claim 1, wherein determining the movement of the eye comprises determining an angular position of the eye.

18. The method of claim 1, wherein determining the movement of the eye comprises:

classifying and quantifying a user gaze behavior;

identifying a blink of the eye;

identifying a smooth pursuit of the eye;

identifying a saccade of the eye;

identifying a fixation of the eye; or identifying a nystagmus of the eye.

19. The method of claim 1, wherein determining the movement of the eye comprises determining an eye characteristic based on:

the determining of the movement of the eye; and a gaze direction determined from a second tracking system having a sampling rate that is less than a frame rate of the one or more sensors.

20. The method of claim 1 further comprising calibrating motion tracking output to compensate for geometrical factors.

21. The method of claim 1, wherein the eye movement is determined based both coherent and incoherent light sources illuminating the eye.

22. The method of claim 1 further comprising initiating a functionality on the electronic device based on assessing the image-to-image changes in the sequence of images.

23. The method of claim 1, wherein the determining the movement of the eye comprises determining a gaze direction of the eye relative to a viewable portion of a head-mounted device, wherein the head mounted device comprises frame portions surrounding viewable portions, wherein the frame portion comprises a plurality of light sources and a plurality of image sensors.

24. The method of claim 1, wherein the selecting comprises both selecting the light source from the plurality of light sources and selecting the image sensor from the plurality of image sensors based on the pose of the eye.

25. A device comprising:

one or more light sources;

one or more image sensors; and a processor configured to execute instructions stored in a non-transitory computer-readable medium to perform operations comprising:

selecting, at an electronic device having a processor, a light source from a plurality of light sources or an image sensor from a plurality of image sensors for optical-flow-based eye tracking, wherein the light source or image sensor is selected based on a pose of an eye;

producing light from the light source towards a portion of the eye, the light reflecting from the portion of the eye as reflected light;

capturing a sequence of images of the reflected light using the image sensor; assessing image-to-image changes in the sequence of images, the image-to-image changes comprising an amount and a direction of positional change in at least one feature depicted in the images; and determining a movement of the eye based on the image-to-image changes in the sequence of images.

26. A non-transitory computer-readable storage medium storing program instructions executable via one or more processors to perform operations comprising:

selecting, at an electronic device having a processor, a light source from a plurality of light sources or an image sensor from a plurality of image sensors for optical-flow-based eye tracking, wherein the light source or image sensor is selected based on a pose of an eye;

producing light from the light source towards a portion of the eye, the light reflecting from the portion of the eye as reflected light;

capturing a sequence of images of the reflected light using the image sensor; assessing image-to-image changes in the sequence of images, the image-to-image changes comprising an amount and a direction of positional change in at least one feature depicted in the images; and determining a movement of the eye based on the image-to-image changes in the sequence of images.

* * * * *